United States Patent
Sharifi

(10) Patent No.: US 12,247,842 B2
(45) Date of Patent: Mar. 11, 2025

(54) REQUESTING AND RECEIVING REMINDER INSTRUCTIONS IN A NAVIGATION SESSION

(71) Applicant: GOOGLE LLC, Mountain View, CA (US)

(72) Inventor: Matthew Sharifi, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 17/919,967

(22) PCT Filed: May 31, 2022

(86) PCT No.: PCT/US2022/031575
§ 371 (c)(1),
(2) Date: Oct. 19, 2022

(87) PCT Pub. No.: WO2023/234929
PCT Pub. Date: Dec. 7, 2023

(65) Prior Publication Data
US 2024/0210197 A1    Jun. 27, 2024

(51) Int. Cl.
*G01C 21/00*    (2006.01)
*G01C 21/36*    (2006.01)

(52) U.S. Cl.
CPC .................. *G01C 21/3641* (2013.01)

(58) Field of Classification Search
CPC ..... G01C 21/00; G01C 21/36; G01C 21/3641
See application file for complete search history.

(56) References Cited

U.S. PATENT DOCUMENTS

| | | | |
|---|---|---|---|
| 7,577,522 B2 * | 8/2009 | Rosenberg | G06Q 10/109 342/357.29 |
| 7,889,101 B2 | 2/2011 | Yokota | |
| 8,219,115 B1 * | 7/2012 | Nelissen | G06F 9/54 455/418 |
| 9,576,574 B2 | 2/2017 | van Os | |
| 2002/0067308 A1 | 6/2002 | Robertson | |
| 2006/0273930 A1 * | 12/2006 | Godden | G08G 3/02 340/988 |

(Continued)

FOREIGN PATENT DOCUMENTS

GB    2464665 A    4/2010

*Primary Examiner* — Tan Q Nguyen
(74) *Attorney, Agent, or Firm* — MARSHALL, GERSTEIN & BORUN LLP

(57) ABSTRACT

A computing device may implement a method for creating and providing reminders during navigation sessions. The method may include initiating a navigation session for providing a set of navigation instructions to a user from a starting location to a destination location along a route, and receiving, from a user during the navigation session, an input including a request to create a reminder. The method may further include analyzing the input to determine: (i) a content of the reminder, and (ii) a trigger condition for providing the reminder, the trigger condition including a trigger location on the route, and storing the reminder, including the content and the trigger condition. The method may also include, detecting, during a subsequent navigation session, the trigger condition, and, in response to detecting the trigger condition, providing the reminder.

19 Claims, 8 Drawing Sheets

(56) References Cited

U.S. PATENT DOCUMENTS

| | | | |
|---|---|---|---|
| 2012/0136572 A1* | 5/2012 | Norton | G01C 21/3407 |
| | | | 701/465 |
| 2013/0031169 A1* | 1/2013 | Axelrod | H04W 4/021 |
| | | | 709/204 |
| 2015/0226570 A1* | 8/2015 | Takei | G09B 29/10 |
| | | | 701/454 |
| 2019/0206225 A1* | 7/2019 | Adler | G08B 21/24 |

* cited by examiner

REQUESTING AND RECEIVING REMINDER INSTRUCTIONS IN A NAVIGATION SESSION

FIELD OF THE DISCLOSURE

The present disclosure generally relates to navigation sessions and, more particularly, to providing reminder instructions during navigation sessions.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Generally speaking, conventional navigation applications that provide directions to/from destinations are ubiquitous in modern culture. These conventional navigation applications may provide directions and turn-by-turn navigation in order to reach a pre-programmed destination by driving and/or several other modes of transportation (e.g., walking, public transportation, etc.). In particular, conventional navigation applications allow users to specify source and destination points, after which the users are presented with a route including navigation instructions for traveling from the source point to the destination point (or a set of route proposals). The routes are typically generalized route instructions, such that users traveling from the same starting point to the same destination point will receive the same set of navigation instructions or route proposals.

However, users' comfort and skill in executing various maneuvers vary by individual user. For example, while a first user may generally approach turns at safe speeds, a second user may have a tendency for approaching turns at speeds near or above an upper safe speed limit, or may be uncomfortable with approaching a turn at a particular speed. Further, users may have individual preferences regarding particular locations along routes, which may not be applicable to all users.

Thus, in general, conventional navigation applications fail to provide users with personalized navigation instructions specifically tailored to the user, and a need exists for a navigation application that can provide a mechanism for individualized supplemental instructions.

SUMMARY

An example embodiment of the techniques of this disclosure is a method in a computing device for creating and providing reminders during navigation sessions. The method may be implemented by one or more processors and may include: initiating a navigation session for providing a set of navigation instructions to a user from a starting location to a destination location along a route; receiving, during the navigation session, an input including a request to create a reminder; analyzing the input to determine: (i) a content of the reminder, and (ii) a trigger condition for providing the reminder, the trigger condition including a trigger location on the route; storing the reminder, including the content and the trigger condition; detecting during a subsequent navigation session, the trigger condition; and in response to detecting the trigger condition, providing the reminder.

Another example embodiment is a computing device for creating and providing reminders during navigation session. The computing device may include one or more processors and a computer-readable memory, which is optionally non-transitory, coupled to the one or more processors and storing instructions thereon that, when executed by the one or more processors, cause the computing device to: initiate a navigation session for providing a set of navigation instructions to a user from a starting location to a destination location along a route; receive, from a user during the navigation session, an input including a request to create a reminder; analyze the input to determine: (i) a content of the reminder, and (ii) a trigger condition for providing the reminder, the trigger condition including a trigger location on the route; store the reminder including the content and the trigger condition; detect, during a subsequent navigation session, the trigger condition; and in response to detecting the trigger condition, provide the reminder.

Yet another example embodiment is a computer-readable medium, which is optionally non-transitory, storing instructions for creating and providing reminders during navigation sessions, that when executed by one or more processors cause the one or more processors to: initiate a navigation session for providing a set of navigation instructions to a user from a starting location to a destination location along a route; receive, from a user during the navigation session, an input including a request to create a reminder; analyze the input to determine: (i) a content of the reminder, and (ii) a trigger condition for providing the reminder, the trigger condition including a trigger location on the route; store the reminder including the content and the trigger condition; detect, during a subsequent navigation session, the trigger condition; and in response to detecting the trigger condition, provide the reminder.

DETAILED DESCRIPTION

Overview

Figure 1A:
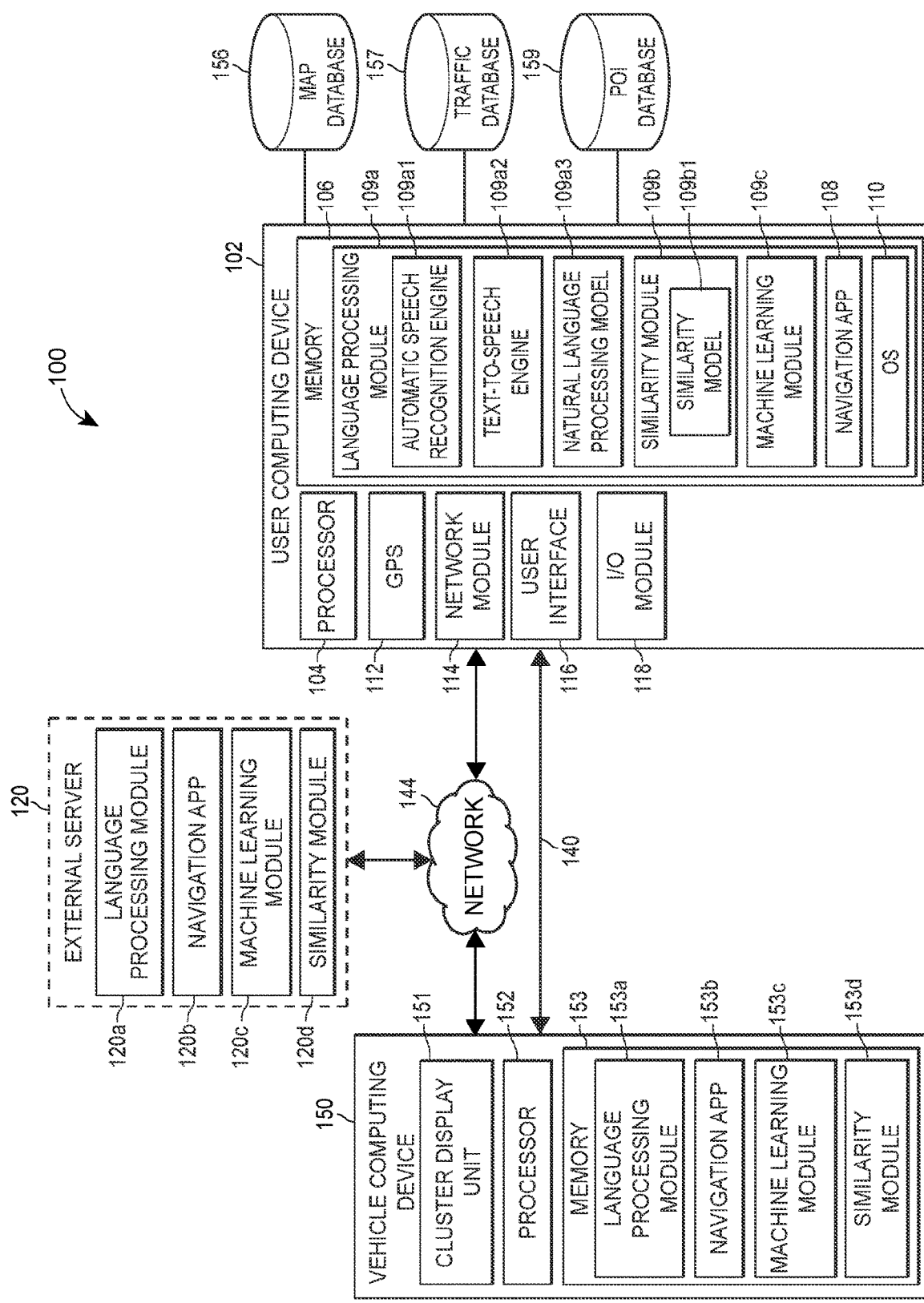
FIG. 1A is a block diagram of an example communication system in which techniques for creating reminders and providing reminders during navigation sessions can be implemented.

Using the techniques of this disclosure, a computing device may generate and provide customized reminders to a user during a navigation session. Before, during, or after a navigation session, a user may provide an input (e.g., by providing a speech input, or by interacting with a GUI on a display) requesting a navigation application to create a reminder for subsequent navigation sessions. If the user provides the input during a route of a navigation session, the navigation application can record the user's current location, direction of travel, speed, and/or other status information at the time when the input is provided, which may be used to generate the reminder if the input does not specify a trigger condition. The input may be converted into text (e.g., using Automatic Speech Recognition (ASR)), and analyzed using rules and/or machine learning to determine the content of the reminder and a trigger condition for the reminder. The trigger condition includes a trigger location, such that when the user reaches the trigger location during a subsequent navigation session, the navigation application will provide the reminder.

For example, the request may explicitly indicate the trigger location, or partially indicate the trigger location (e.g., the navigation application may utilize semantic analysis to determine the trigger location based on the request). If the request does not indicate the trigger location, the navigation application can use the user's location at the time of providing the reminder as the trigger location.

After generating the reminder, the navigation application can store the reminder, including the content (i.e., the instruction to be provided when providing the reminder) and the trigger condition. If the navigation application detects the trigger condition, the navigation application provides the reminder (e.g., by emitting a supplemental route instruction including the reminder, and/or displaying a notification on a GUI presenting navigation instructions). After providing a reminder, the navigation application may monitor for user feedback regarding the reminder for a predetermined amount of time, to provide the user with an opportunity to further refine the reminder.

In a first example, the user can request a reminder regarding a feature of a route that the user is traveling. A user may drive over a pothole while traveling along a route. After driving over the pothole, the user can initiate an input to the navigation application (e.g., by interacting with a GUI on a display or by reciting a triggering phrase). The input may include a request to "remind me about this pothole next time." During subsequent routes (the same route, or any subsequent route including the location of the pothole), the navigation application can provide the reminder (e.g., "watch out for the pothole that is coming up") when the navigation application detects that the user is approaching the pothole. In this example, the user implicitly provides the trigger location by reciting "this pothole," such that the navigation application can determine to use the user's location at the time the request was initiated as the location of the pothole and the corresponding trigger location.

In a second example, the techniques of the present disclosure may be configured to generate a reminder based on a request received prior to a route. A user may initiate input to the navigation application, and request to "remind me to call John when we are ten minutes away from his home." In this example, the request explicitly indicates the trigger location. On the next route where a user is ten minutes away from John's house, the navigation application can provide the reminder. Further, by analyzing the request, the navigation application can determine to only provide the reminder once (i.e., the next time the user is ten minutes away from John's house), rather than on every subsequent route. To make this determination, the navigation application can utilize natural language processing techniques, including machine learning.

In a third example, the techniques of the present disclosure may be configured to generate reminders for locations similar to a location encountered by a user. In a first instance, the user may request "remind me to approach this turn more slowly next time." In response, the navigation application can generate a reminder to remind the user to approach the particular turn at the user's location when the reminder was initiated more slowly. In a second instance, the user may request "remind me to approach turns like this more slowly." In response, the navigation application can identify turns similar to the particular turn at the user's location. For example, the navigation application can identify turns having a predetermined number of shared characteristics with the particular turn, and/or can identify similar turns using machine learning (e.g., using a distance metric).

In a fourth example, the techniques of the present disclosure can generate reminders similar to those created by a user. The navigation application may determine that two or more trigger locations for a respective two or more reminders have similar characteristics. For example, the user may have requested reminders for two respective turns having similar turning angles. The navigation application can then generate a general reminder for any turn having such a turning angle, thereby improving the user's experience and improving user safety.

In this manner, aspects of the present disclosure provide a technical solution to the problem of non-optimal route instructions by configuring and providing route instructions personalized for a user. Conventional systems provide generalized navigation instructions to users, such that users traveling from the same starting point to the same destination will receive the same generalized navigation instructions. Consequently, conventional systems do not provide personalized route instructions based on individual preferences and personal nuances. By contrast, the techniques of the present disclosure enable a user to configure personalized reminders regarding locations or features along a route, which can function as supplemental route instructions. In addition to improving user experience, such reminders also improve safety, as a user can configure reminders related to particular road hazards or features that the user finds dangerous. Further, because a user can generate the reminder while or immediately after encountering a route feature related to the reminder, the user is less likely to forget to set up the reminder and more likely to receive the user experience and/or safety benefits provided by the reminder.

The techniques of the present disclosure may work in the setting of either a speech-based or a touch-based interface. However, for ease of discussion, the conversation flow between the user and the navigation application (and corresponding processing components) described herein may generally be in the context of a speech based configuration. Nevertheless, in the case of a touch-based interface, reminders can be displayed to a user in the user interface, and/or a user can request a reminder or provide user feedback to refine a reminder via textual inputs or by interacting via UI elements (e.g., icons). Embodiments disclosed herein that are described in the context of a speech-based interface may also be applied to the context of a touch-based interface. All embodiments disclosed herein in which inputs or outputs are described in the context of a speech-based interface may be adapted to apply to the context of a touch-based interface. Further, the techniques discussed herein may apply to a system including a combination of touch-based and speech-based features. For example, the user may request a reminder via a speech input, and the system may provide the reminder via a display on graphical user interface (GUI) (or via a combination of an reminder emitted via a speaker and a displayed reminder).

Further, it should also be understood that the term "reminder," as used herein, can encompass a reminder for the user to perform an action (e.g., a navigation maneuver) and/or to perform an action in a certain manner, a note, a comment, an observation, an instruction, etc. Generally speaking, a "reminder" conveys information to the user, where the information can be any information requested by the user.

Example Hardware and Software Components

Referring first to FIG. 1A, an example communication system 100 in which techniques for creating and providing reminders during navigation sessions can be implemented includes a user computing device 102. The user computing device 102 may be a portable or mobile device such as a smart phone or a tablet computer, for example. The user computing device 102 may also be a laptop computer, a desktop computer, a personal digital assistant (PDA), a wearable device such as a smart watch or smart glasses, etc. In some embodiments, the user computing device 102 may be removably mounted in a vehicle, embedded into a vehicle, and/or may be capable of interacting with a head unit of a vehicle to provide navigation instructions.

The user computing device 102 may include one or more processor(s) 104 and a memory 106 storing machine-readable instructions executable on the processor(s) 104. The processor(s) 104 may include one or more general-purpose processors (e.g., CPUs), and/or special-purpose processing units (e.g., graphical processing units (GPUs)). The memory 106 can be, optionally, a non-transitory memory and can include one or several suitable memory modules, such as random access memory (RAM), read-only memory (ROM), flash memory, other types of persistent memory, etc. The memory 106 may store instructions for implementing a navigation application 108 that can provide navigation directions (e.g., by displaying directions or emitting audio instructions via the user computing device 102), display an interactive digital map, request and receive routing data to provide driving, walking, or other navigation directions, provide various geo-located content such as traffic, points-of-interest (POIs), and weather information, etc.

Further, the memory 106 may include a language processing module 109a configured to implement and/or support the techniques of this disclosure for generating reminders. Namely, the language processing module 109a may include an automatic speech recognition (ASR) engine 109a1 that is configured to transcribe speech inputs from a user into sets of text. Further, the language processing module 109a may include a text-to-speech (TTS) engine 109a2 that is configured to convert text into audio outputs, such as audio requests, navigation instructions, and/or other outputs for the user. In some scenarios, the language processing module 109a may include a natural language processing (NLP) model 109a3 that is configured to output textual transcriptions, reminder content and trigger condition interpretations, and/or audio outputs related to a speech input received from a user of the user computing device 102. It should be understood that, as described herein, the ASR engine 109a1 and/or the TTS engine 109a2 may be included as part of the NLP model 109a3 in order to transcribe user speech inputs into a set of text, convert text outputs into audio outputs, and/or any other suitable function described herein as part of an exchange of information between the user computing device 102 and the user.

Generally, the language processing module 109a may include computer-executable instructions for training and operating the NLP model 109a3. In general, the language processing module 109a may train one or more NLP models 109a3 by establishing a network architecture, or topology, and adding layers that may be associated with one or more activation functions (e.g., a rectified linear unit, softmax, etc.), loss functions and/or optimization functions. Such training may generally be performed using a symbolic method, machine learning (ML) models, and/or any other suitable training method. More generally, the language processing module 109a may train the NLP models 109a3 to perform two techniques that enable the user computing device 102, and/or any other suitable device (e.g., vehicle computing device 150) to understand the words spoken by a user and/or words generated by a text-to-speech program (e.g., TTS engine 109a2) executed by the processor 104: syntactic analysis and semantic analysis.

Syntactic analysis generally involves analyzing text using basic grammar rules to identify overall sentence structure, how specific words within sentences are organized, and how the words within sentences are related to one another. Syntactic analysis may include one or more sub-tasks, such as tokenization, part of speech (PoS) tagging, parsing, lemmatization and stemming, stop-word removal, and/or any other suitable sub-task or combinations thereof. For example, using syntactic analysis, the NLP model 109a3 may generate textual transcriptions from the speech inputs from the user. Additionally, or alternatively, the NLP model 109a3 may receive such textual transcriptions as a set of text from the ASR engine 109a1 in order to perform semantic analysis on the set of text.

Semantic analysis generally involves analyzing text in order to understand and/or otherwise capture the meaning of the text. In particular, the NLP model 109a3 applying semantic analysis may study the meaning of each individual word contained in a textual transcription in a process known as lexical semantics. Using these individual meanings, the NLP model 109a3 may then examine various combinations of words included in the sentences of the textual transcription to determine one or more contextual meanings of the words. Semantic analysis may include one or more sub-tasks, such as word sense disambiguation, relationship extraction, sentiment analysis, and/or any other suitable sub-tasks or combinations thereof. For example, using semantic analysis, the NLP model 109a3 may generate one or more reminder content and trigger condition interpretations based on the textual transcriptions from the syntactic analysis.

In these aspects, the language processing module 109a may include an artificial intelligence (AI) trained algorithm (e.g., the natural language processing (NLP) model 109a3) that is configured to interact with a user that is accessing the navigation app 108. The user may be directly connected to the navigation app 108 to provide verbal input/responses (e.g., speech inputs), and/or the user request may include textual inputs/responses that the TTS engine 109a2 (and/or other suitable engine/model/algorithm) may convert to audio inputs/responses for the NLP model 109a3 to interpret. When a user accesses the navigation app 108, the inputs/responses spoken by the user and/or generated by the TTS engine 109a2 (or other suitable algorithm) may be analyzed by the NLP model 109a3 to generate textual transcriptions and reminder content and trigger condition interpretations.

The language processing module 109a may train the one or more NLP models 109a3 to apply these and/or other NLP techniques using a plurality of training speech inputs from a plurality of users. As a result, the NLP model 109*a*3 may be configured to output textual transcriptions and reminder content and trigger condition interpretations corresponding to the textual transcriptions based on the syntactic analysis and semantic analysis of the user's speech inputs.

Further, the memory 106 may also include a similarity module 109*b* configured to support the techniques of this disclosure for generating reminders. The similarity module 109*b* may include a similarity model 109*b*1 configured to identify, based on an input location (or other route feature such as route segment or navigation instruction), locations that are similar to the input location. For example, if a user input indicates that a reminder should be generated for locations or route features similar to a particular location or route feature, the similarity model 109*b*1 can identify the similar locations and/or route features. As another example, the similarity model 109*b*1 can also identify that two reminders (or a predetermined minimum number of reminders), concern similar trigger locations, and can indicate to the navigation application that the two reminders are similar. The similarity model 109*b*1 can also determine other locations that are similar to the trigger locations of the two reminders, such that the navigation application can generate a general reminder for locations similar to the trigger locations of the two reminders. The similarity module 109*b* can be configured to interact with the navigation application 108 to provide functionalities such as determining whether the trigger conditions or locations of two or more reminders are similar, and determining locations similar to an input location, which will be described in further detail below.

In certain aspects, one or more types of machine learning (ML) may be employed by the language processing module 109*a* to train the NLP model(s) 109*a*3 and/or the similarity model 109*b*1. The ML may be employed by the ML module 109*c*, which may store one or more ML models. A first example ML model included in the ML module 109*c* may be configured to receive a set of text corresponding to a user input, and to output a reminder content and a trigger condition for the reminder based on the set of text. A second example ML model included in the ML module 109*c* may be configured to receive a location or route feature (e.g., a navigation instruction or road segment), and to output similar locations or route features. The NLP model(s) 109*a*3 may be and/or include one or more types of ML models, such as the first example ML model described above. More specifically, in these aspects, the NLP model 109*a*3 may be or include a machine learning model (e.g., a large language model (LLM)) trained by the ML module 109*c* using one or more training data sets of text in order to output one or more training reminder contents and one or more training trigger conditions, as described further herein. Similarly, the similarity model 109*b*1 may be and/or include one or more types of ML models, such as the second example ML model described above. In these aspects, the similarity model 109*b*1 may be trained by the ML module 109*c* using one or more training data sets of navigation data in order to output locations similar to an input location. For example, artificial neural networks, recurrent neural networks, deep learning neural networks, a Bayesian model, and/or any other suitable ML model may be used to train and/or otherwise implement the NLP model(s) 109*a*3 and/or the similarity model 109*b*1. In these aspects, training may be performed by iteratively training the NLP model(s) 109*a*3 and/or the similarity model 109*b*1 using labeled training samples (e.g., training user inputs). While one machine learning module 109*c* is illustrated in FIG. 1A, the machine learning module 109*c* may be implemented by separate modules (e.g., a first machine learning module including the first example ML model above, and a second machine learning module including the second example ML model above).

In instances where the NLP model(s) 109*a*3 or the similarity model 109*b*1 is an artificial neural network, training of the NLP model(s) 109*a*3 may produce byproduct weights, or parameters which may be initialized to random values. The weights may be modified as the network is iteratively trained, by using one of several gradient descent algorithms, to reduce loss and to cause the values output by the network to converge to expected, or "learned", values. In embodiments, a regression neural network may be selected which lacks an activation function, wherein input data may be normalized by mean centering, to determine loss and quantify the accuracy of outputs. Such normalization may use a mean squared error loss function and mean absolute error. The artificial neural network model may be validated and cross-validated using standard techniques such as hold-out, K-fold, etc. In embodiments, multiple artificial neural networks may be separately trained and operated, and/or separately trained and operated in conjunction.

In embodiments, the one or more NLP models 109*a*3 and/or the similarity model 109*b*1 may include an artificial neural network having an input layer, one or more hidden layers, and an output layer. Each of the layers in the artificial neural network may include an arbitrary number of neurons. The plurality of layers may chain neurons together linearly and may pass output from one neuron to the next, or may be networked together such that the neurons communicate input and output in a non-linear way. In general, it should be understood that many configurations and/or connections of artificial neural networks are possible. For example, the input layer may correspond to input parameters that are given as full sentences, or that are separated according to word or character (e.g., fixed width) limits. The input layer may correspond to a large number of input parameters (e.g., one million inputs), in some embodiments, and may be analyzed serially or in parallel. Further, various neurons and/or neuron connections within the artificial neural network may be initialized with any number of weights and/or other training parameters. Each of the neurons in the hidden layers may analyze one or more of the input parameters from the input layer, and/or one or more outputs from a previous one or more of the hidden layers, to generate a decision or other output. The output layer may include one or more outputs, each indicating a prediction. In some embodiments and/or scenarios, the output layer includes only a single output.

Depending on the implementation, one or both of the NLP model(s) 109*a*3 and the similarity model 109*b*1 may use rules-based analysis rather than machine learning techniques, or a combination of rules-based analysis and machine learning.

It is noted that although FIG. 1A illustrates the navigation application 108 as a standalone application, the functionality of the navigation application 108 also can be provided in the form of an online service accessible via a web browser executing on the user computing device 102, as a plug-in or extension for another software application executing on the user computing device 102, etc. The navigation application 108 generally can be provided in different versions for different operating systems. For example, the maker of the user computing device 102 can provide a Software Development Kit (SDK) including the navigation application 108 for the Android™ platform, another SDK for the iOS™ platform, etc. Further, depending on the implementation, one or more of the modules 109a, 109b, and 109c may be included in the navigation application 108.

The memory 106 may also store an operating system (OS) 110, which can be any type of suitable mobile or general-purpose operating system. The user computing device 102 may further include a global positioning system (GPS) 112 or another suitable positioning module, a network module 114, a user interface 116 for displaying map data and directions, and input/output (I/O) module 118. The network module 114 may include one or more communication interfaces such as hardware, software, and/or firmware of an interface for enabling communications via a cellular network, a Wi-Fi network, or any other suitable network such as a network 144, discussed below. The I/O module 118 may include I/O devices capable of receiving inputs from, and providing outputs to, the ambient environment and/or a user. The I/O module 118 may include a touch screen, display, keyboard, mouse, buttons, keys, microphone, speaker, etc. In various implementations, the user computing device 102 can include fewer components than illustrated in FIG. 1A or, conversely, additional components.

The user computing device 102 may communicate with an external server 120 and/or a vehicle computing device 150 via a network 144. The network 144 may include one or more of an Ethernet-based network, a private network, a cellular network, a local area network (LAN), and/or a wide area network (WAN), such as the Internet. The navigation application 108 may transmit map data, navigation directions, and other geo-located content from a map database 156 to the vehicle computing device 150 for display on the cluster display unit 151. Additionally, or alternatively, the navigation application 108 may access map, navigation, and geo-located content that is stored locally at the user computing device 102, and may access the map database 156 periodically to update the local data or during navigation to access real-time information, such as real-time traffic data. Moreover, the user computing device 102 may be directly connected to the vehicle computing device 150 through any suitable direct communication link 140, such as a wired connection (e.g., a USB connection).

In certain aspects, the network 144 may include any communication link suitable for short-range communications and may conform to a communication protocol such as, for example, Bluetooth™ (e.g., BLE), Wi-Fi (e.g., Wi-Fi Direct), NFC, ultrasonic signals, etc. Additionally, or alternatively, the network 144 may be, for example, Wi-Fi, a cellular communication link (e.g., conforming to 3G, 4G, or 5G standards), etc. In some scenarios, the network 144 may also include a wired connection.

The external server 120 may be a remotely located server that includes processing capabilities and executable instructions necessary to perform some/all of the actions described herein with respect to the user computing device 102. For example, the external server 120 may include a language processing module 120a that is similar to the language processing module 109a included as part of the user computing device 102, and the module 120a may include one or more of the ASR engine 109a1, the TTS engine 109a2, and/or the NLP model 109a3. The external server 120 may also include a navigation app 120b, a ML module 120c, and a similarity module 120d that are similar to the navigation app 108, the ML module 109c, and the similarity module 109b, respectively.

The vehicle computing device 150 includes one or more processor(s) 152 and a memory 153 storing computer-readable instructions executable by the processor(s) 152. The memory 153 may store a language processing module 153a, a navigation application 153b, a ML module 153c, and a similarity module 153d that are similar to the language processing module 153a, the navigation application 108, the ML module 109c, and the similarity module 109b, respectively. The navigation application 153b may support similar functionalities as the navigation application 108 from the vehicle-side and may facilitate rendering of information displays, as described herein. For example, in certain aspects, the user computing device 102 may provide the vehicle computing device 150 with an accepted route that has been accepted by a user, and the corresponding navigation instructions to be provided to the user as part of the accepted route. The navigation application 153b may then proceed to render the navigation instructions within the cluster unit display 151 and/or to generate audio outputs that verbally provide the user with the navigation instructions via the language processing module 153a.

In any event, the user computing device 102 may be communicatively coupled to various databases, such as a map database 156, a traffic database 157, and a point-of-interest (POI) database 159, from which the user computing device 102 can retrieve navigation-related data. The map database 156 may include map data such as map tiles, visual maps, road geometry data, road type data, speed limit data, etc. The traffic database 157 may store historical traffic information as well as real-time traffic information. The POI database 159 may store descriptions, locations, images, and other information regarding landmarks or points-of-interest. While FIG. 1A depicts databases 156, 157, and 159, the user computing device 102, the vehicle computing device 150, and/or the external server 120 may be communicatively coupled to additional, or conversely, fewer, databases. For example, the user computing device 102 and/or the vehicle computing device 150 may be communicatively coupled to a database storing weather data.

Figure 1B:
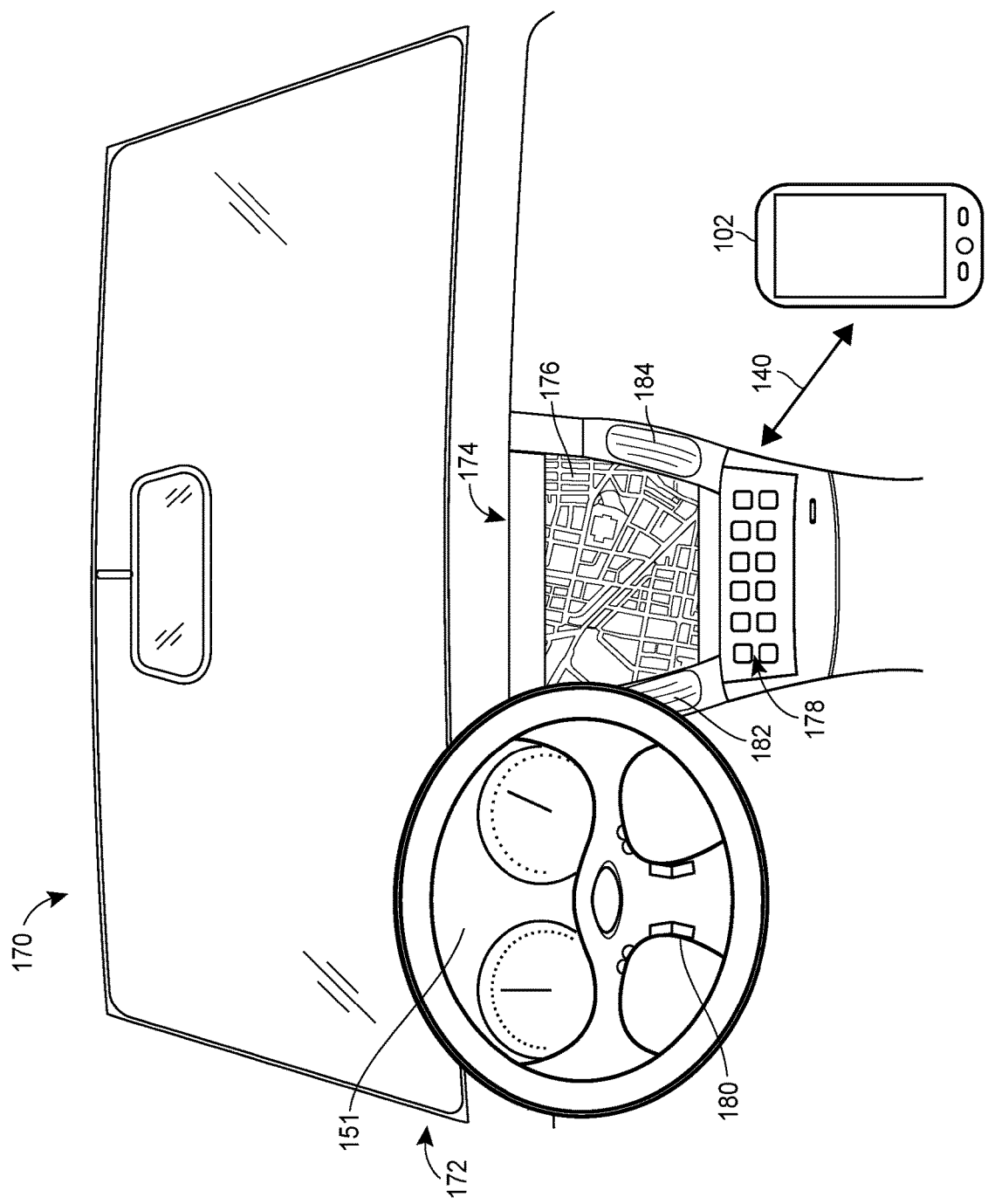
FIG. 1B illustrates an example vehicle interior in which a user may utilize the user computing device or the vehicle computing device of FIG. 1A to request reminders and receive reminders during navigation sessions.

Turning to FIG. 1B, the user computing device 102 may transmit information for rendering/display of navigation instructions within a vehicle environment 170. The user computing device 102 may be located within a vehicle 172, and may be a smartphone. However, while FIG. 1B depicts the user computing device 102 as a smartphone, this is for case of illustration only, and the user computing device 102 may be any suitable type of device and may include any suitable type of portable or non-portable computing devices.

In any event, the vehicle 172 may include a head unit 174, which in some aspects, may include and/or otherwise house the user computing device 102. Even if the head unit 174 does not include the user computing device 102, the device 102 may communicate (e.g., via a wireless or wired connection) with the head unit 174 to transmit navigation information, such as maps or audio instructions and/or information displays to the head unit 174 for the head unit 174 to display or emit. Additionally, the vehicle 172 includes the cluster display unit 151, which may display information transmitted from the user computing device 102. In certain aspects, a user may interact with the user computing device 102 by interacting with head unit controls. In addition, the vehicle 172 may provide the communication link 140, and the communication link 140, for example, may include a wired connection to the vehicle 172 (e.g., via a USB connection) through which the user computing device 102 may transmit the navigation information and the corresponding navigation instruction for rendering within the cluster display unit 151, the display 176, and/or as audio output through speakers 184.

Accordingly, the head unit 174 may include the display 176 for outputting navigation information such as a digital map. Of course, the cluster display unit 151 may also display such navigation information, including a digital map. Such a map rendered within the cluster display unit 151 may provide a driver of the vehicle 172 with more optimally located navigation instructions, and as a result, the driver may not be forced to look away from the active roadway as much while driving in order to safely navigate to their intended destination. Nevertheless, the display 176 in some implementations includes a software keyboard for entering text input, which may include the name or address of a destination, point of origin, etc.

Hardware input controls 178 and 180 on the head unit 174 and the steering wheel, respectively, can be used for entering alphanumeric characters or to perform other functions for requesting navigation directions. For example, the hardware input controls 178, 180 may be and/or include rotary controls (e.g., a rotary knob), trackpads, touchscreens, and/or any other suitable input controls. The head unit 174 also can include audio input and output components such as a microphone 182 and speakers 184, for example. As an example, the user computing device 102 may communicatively connect to the head unit 174 (e.g., via Bluetooth™, WiFi, cellular communication protocol, wired connection, etc.) or may be included in the head unit 174. The user computing device 102 may present map information via the cluster display unit 151, emit audio instructions for navigation via the speakers 184, and receive inputs from a user via the head unit 174 (e.g., via a user interacting with the input controls 178 and 180, the display 176, or the microphone 182).

Example Methods for Generating Reminders and Providing Reminders During Navigation Sessions The techniques of this disclosure for generating reminders and providing reminders during navigation sessions are discussed below with reference to the flow diagrams illustrated in FIGS. 2A-2C. Throughout the description of FIGS. 2A-2C, actions described as being performed by the user computing device 102 may, in some implementations, be performed by the external server 120, the vehicle computing device 150, and/or may be performed by the user computing device 102, the external server 120, and/or the vehicle computing device 150 in parallel. For example, the user computing device 102, the external server 120, and/or the vehicle computing device 150 may utilize the language processing module 109a, 120a, 153a, the similarity module 109b, 120d, 153d, and/or the machine learning module 109c, 120c, 153c to generate reminders based on user input, detect trigger conditions for reminders, and provide reminders to the user during navigation sessions.

Figure 2A:
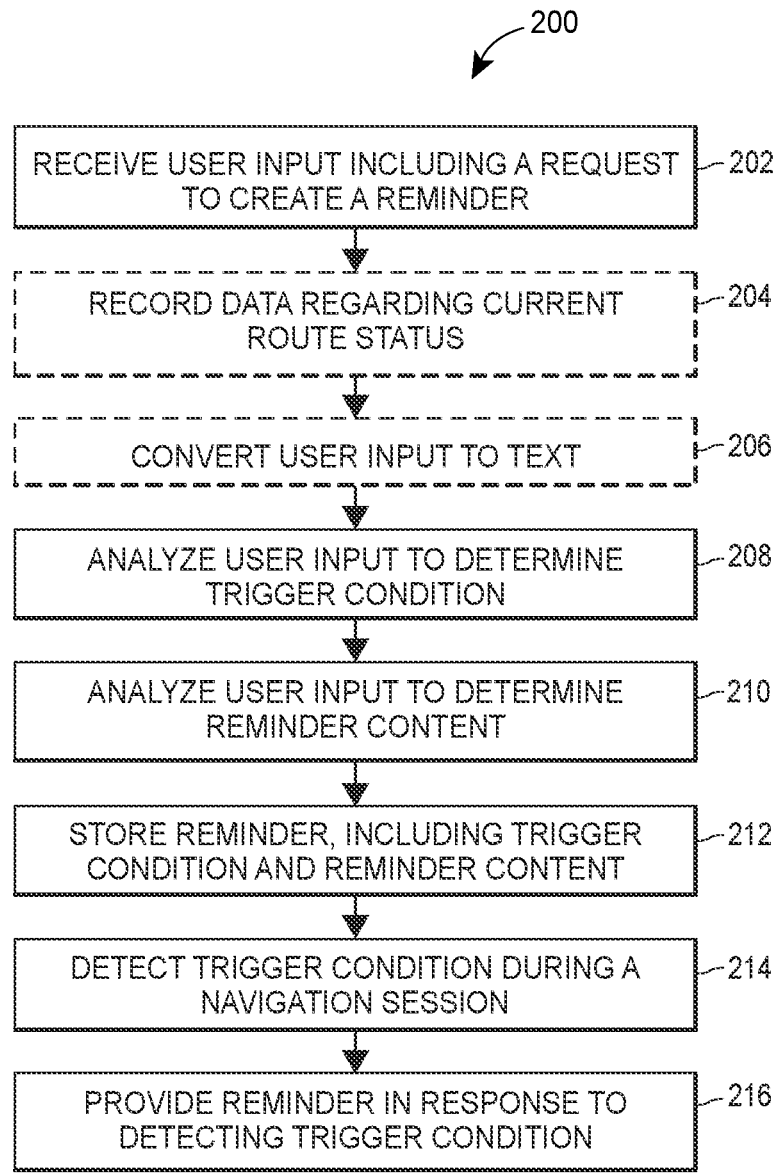
FIG. 2A is a flow diagram of an example method for creating reminders and providing reminders during navigation sessions.

Referring first to FIG. 2A, a method 200 for generating a reminder and providing the reminder during a navigation session, is illustrated. At block 202, the user computing device 102 receives a user input including a request to create a reminder. To initiate providing input, the user can interact with the navigation application 108. For example, the user can recite a triggering phrase that prompts the navigation application 108 to monitor for user input (e.g., by activating a microphone of the user computing device 102). As another example, the user can physically interact with a button of the vehicle computing device 150 (communicatively coupled to the user computing device 102) or user computing device 102, or with a GUI element displayed by the cluster display unit 151 or user interface 116, which prompts the navigation application 108 to monitor for user input.

Depending on the implementation, the user computing device 102 may determine, upon receiving the user input, that the user input includes a request to create a reminder. For example, if the user input was initiated in response to the user interacting with a specific GUI element for creating a reminder, the user computing device 102 can determine, without analyzing the user input, that the user input includes a request to create a reminder. In other example implementations, the user computing device 102 determines that the user input includes a request to create a reminder based on analyzing the user input. For example, the user computing device 102 can determine that the user input includes a request to create a reminder if the language processing module 109a determines that the user input includes certain trigger phrases (e.g., phrases including words such as "reminder," or "remind," or words with similar meaning), and/or can determine based on semantic or syntactic analysis that the user is requesting a reminder (i.e., by applying the NLP model 109a3 to the user input).

The user computing device 102 may receive the user input during a navigation session (i.e., while the user computing device 102 is providing navigation instructions), or can receive the user input outside of a navigation session (i.e., before or after a navigation session). In scenarios in which the user computing device 102 receives the user input during a navigation session, then at block 204, the user computing device 102 can, upon the user initiating the user input, record data regarding current route status. Such data may include a current location, a direction travel, a speed, a time, an indication of the route, a currently-provided and/or last-provided navigation instruction, and any other information helpful for later generating the reminder, as will be explained in further detail below. In scenarios in which the user computing device 102 receives the user input outside of a navigation session, the user computing device 102 can refrain from performing block 204. Alternatively, even in such scenarios, the user computing device 102 may still record available data, such as a current location.

Depending on the form in which the user computing device 102 receives the user input, the user computing device 102 may or may not perform block 206. If the user computing device 102 receives the user input in the form of a speech input (i.e., an audio input), then the user computing device 102 can convert the user input to text (e.g., using the ASR engine 109a1 included in the language processing module 109a). The user computing device 102 can then analyze the user input by analyzing the converted text. If the user computing device 102 receives the user input in the form of a text input (e.g., from the user interacting with a GUI of the navigation application 108), then the user computing device 102 may refrain from performing block 206. At block 206 or when initiating the analysis at block 208, the user computing device 102 may parse the user input (e.g., using the language processing module 109a), such that the analysis at blocks 208 and 210 is performed on the parsed user input.

At block 208, after receiving the user input, the user computing device 102 analyzes the user input to determine a trigger condition. The trigger condition includes one or more conditions that, if satisfied, will trigger the user computing device 102 to provide the reminder. The trigger condition includes at least a trigger location, which indicates a location at which the user computing device 102 is to provide the reminder during a navigation session. The trigger condition may include more than one trigger location. For example, if the user input includes "remind me to approach turns like this more slowly." then the trigger location can include the particular turn to which the user is referring (i.e., a turn that the user has most recently completed), and any other turns having similar characteristics to the particular turn, as will be explained in further detail below. The trigger condition may include other conditions in addition to trigger location, such as trigger speed, direction of travel, frequency at which the reminder should be repeated (if at all), or any other condition specified in a user input, as will be further described with reference to FIG. 2B.

Figure 2B:
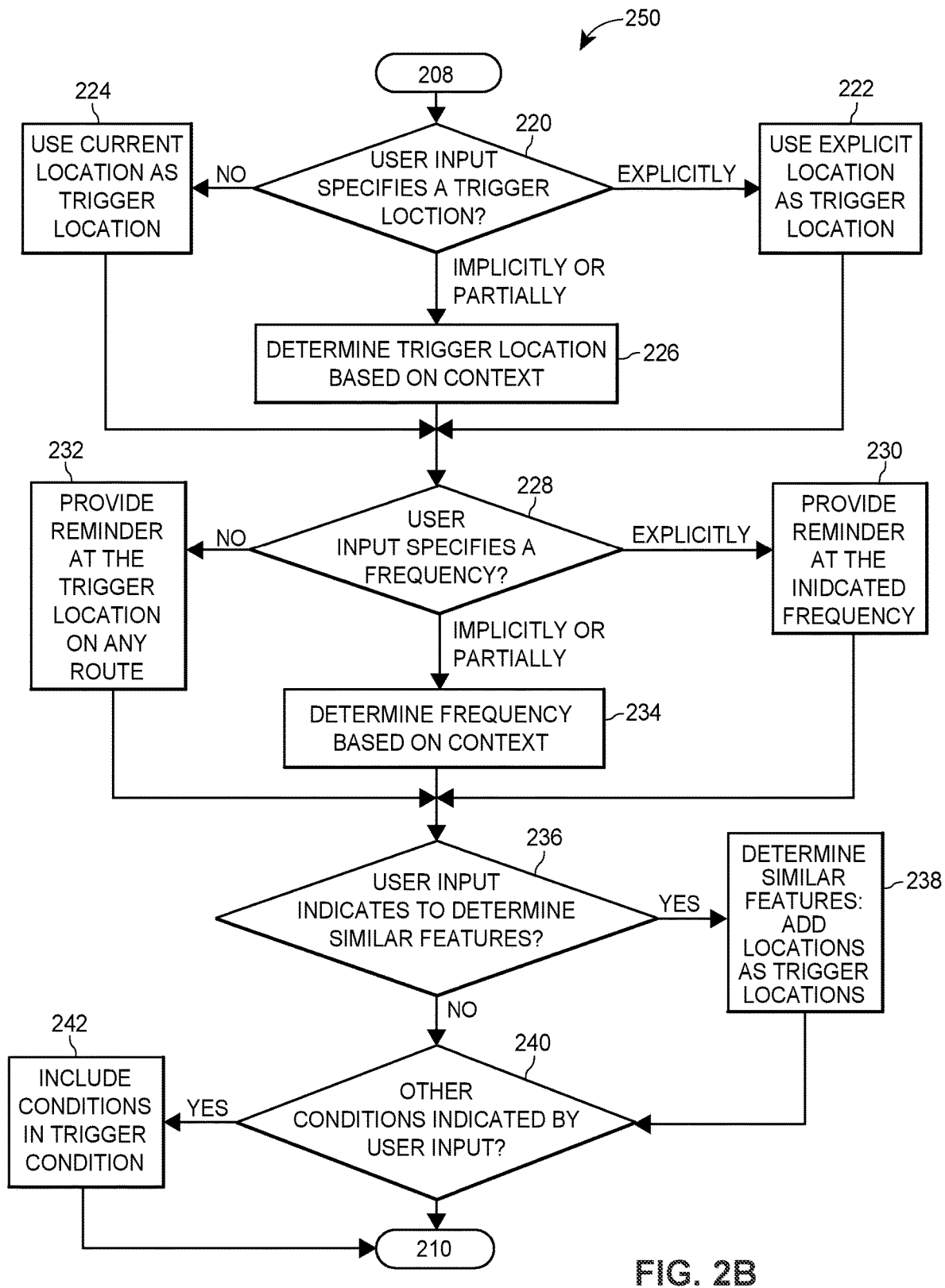
FIG. 2B is a flow diagram of an example method for analyzing user input to generate a reminder.

Turning to FIG. 2B, an example method 250 illustrates the actions that the user computing device 102 may perform at block 208 when analyzing the user input to determine the trigger condition. To analyze the user input, the user computing device 102 may use a rules-based approach, machine learning techniques, or a combination of these techniques. For example, the NLP model 109a3, the similarity model 109b1, and/or the ML module 109c, which the user computing device 102 may apply to the user input, may include rules (i.e., predetermined/preconfigured rules), trained ML models, or a combination of these. Generally speaking, the analysis at block 208 (and block 210) may be performed using the NLP model 109a3, the similarity model 109b1, and/or the machine learning module 109c, with specific examples discussed below. Further, while FIG. 2B illustrates example analysis steps, these steps may be performed in a different order than as illustrated in FIG. 2B, and/or in parallel.

At block 220, the user computing device 102 determines whether the user input specifies a trigger location. If the user input explicitly specifies a trigger location, then the flow proceeds to block 222, where the user computing device 102 utilizes the explicitly-specified location as the trigger location. For example, an explicit location may be an address, a business or point of interest having a specific location, or a custom location previously configured by the user in the navigation application (e.g., a custom location "John's house," for which the user has provided an address). To determine whether the user input specifies an explicit location, the user computing device 102 can compare the specified location with locations included in the map database 156 and the POI database 159. If the user input does not specify a location, then the flow proceeds to block 224. At block 224, as a default, the user computing device 102 can set the trigger location as the user's current location at the time the user input was initiated (as recorded at block 204).

If the user input implicitly or partially specifies a location, then the flow proceeds from block 220 to block 226. At block 226, the user computing device 102 determines the trigger location based on context. The context can include the current location of the user, the navigation instructions currently or last provided to the user, and/or the user input itself (i.e., determined based on syntactic/semantic analysis of the user input). The user input may implicitly identify the trigger location by specifying a route feature, such as a particular route segment or navigation instruction to which the reminder pertains. The user computing device 102 can identify the route feature, and use the location of the route feature as the trigger location. For example, if the user input is "remind me to approach this pothole more slowly," and the user input is received during an initial navigation session, the user computing device 102 can analyze the user input (e.g., using the NLP model 109a3), to determine that the trigger location corresponds to the location of "this pothole." Because the user input was received during the initial navigation session, the user computing device 102 can identify the user's location at the time the user input was initiated (as recorded at block 204), as the location of the pothole and therefore as the trigger location. (If potholes are recorded in the map database 156 or POI database 159, the user computing device 102 can identify the location of the pothole using these databases, by, for example, identifying the most-recently traversed pothole). As another example, if the user input is received during an initial navigation session and is "remind me to approach this turn more slowly," or "remind me to approach turns like this more slowly," then the user computing device can identify that the trigger location corresponds to the location of "this turn." The user computing device 102 can set the location of the most-recently made turn in the navigation session as the trigger location. If no turn was recently made, the user computing device 102 can utilize the location of the next turn in the navigation session. In the case where the user input is "remind me to approach turns like this more slowly." the user computing device 102 may identify similar locations to the location of the turn, as will be discussed with reference to block 236.

In addition to the geographic location corresponding to the trigger location, the user computing device 102 can also include the user's direction of travel at the time the user input was initiated in the trigger location (or otherwise in the trigger condition), such that the reminder will be triggered if the user is traveling in the same direction as when the user requested the reminder. If the user input specifies a direction of travel, the user computing device 102 can include the specified direction of travel in the trigger condition.

From blocks 222, 224, or 226, the flow can proceed to block 228, where the user computing device 102 determines whether the user input specifies a frequency for the reminder (i.e., how often the reminder should be provided). If the user input explicitly specifies a frequency, then the flow proceeds to block 230, where the user computing device 102 provides the reminder at the indicated frequency. For example, if the user input includes "remind me to stop here next time I'm here," then the frequency explicitly indicated by the user input is one time—i.e., the next time the user is at the location. If the user input does not indicate a frequency, then the flow can instead proceed to block 232. At block 232, as a default, the user computing device 102 can determine to provide the reminder at the trigger location during any route. In some cases, user input instead specifies the frequency implicitly or partially. In such cases, the user computing device 102 can determine the frequency based on context. Similar to block 226, the context can include the current location of the user, the navigation instructions currently or last provided to the user, and/or the user input itself (i.e., determined based on syntactic/semantic analysis of the user input). As one example, if the user input indicates "remind me to call John when I am 10 minutes away from John's house," then, because the user input indicates a particular action to perform, the user computing device 102 can determine that the reminder should only be provided the next time the user is 10 minutes away from John's house (e.g., later in the navigation session if the user input is received during a navigation session, or during the next navigation session).

From blocks 230, 232, or 234, the flow can proceed to block 236. At block 236, the user computing device 102 determines whether the user input indicates to include similar route features or similar locations in the reminder. For example, if the reminder includes "remind to approach turns like this more slowly next time," then the user computing device 102 can determine (e.g., using the NLP model 109a3) that the user is requesting a reminder at both (i) the location of the turn, and (ii) the locations of any similar turns. In response, the flow proceeds to block 238, where the user computing device 102 determines similar route features and adds the locations of those route features to the trigger locations for the reminder. Continuing the example above, the user computing device 102 can determine (e.g., using the similarity model 109*b*1) turns that are similar to the turn, and include the locations of these turns in the trigger condition as trigger locations.

The user computing device 102 can utilize the similarity model 109*b*1 to determine whether a route feature (and/or location) is similar to other route features (and/or locations). To identify route features and/or locations that are similar, the similarity model 109*b*1 can analyze locations included in the map database 156 and/or the POI database 159. The similarity model 109*b*1 may only analyze a portion of the locations included in the map database 156/POI database 159 (e.g., a portion including the geographic region of the user, and/or a portion including routes previously traveled by the user). Further, the similarity model 109*b*1 can function in a variety of ways, depending on the implementation. In some implementations, the similarity model 109*b*1 determines whether route features share a minimum number of characteristics, and/or share key characteristics or a minimum number of characteristics. Characteristics are attributes that define a route feature. Accordingly, the type of characteristics can vary by route feature. Characteristics of a turn, for example, may include turning angle, speed limit, visual blockages at the turn, street signage at the turn, presence of streetlights at the turn, presence of crosswalks at the turn, whether the turn has a designated turn lane, accident history at the turn, etc. Characteristics of a road segment, for example, may include speed limit, presence of shoulders, accident history, street signage, presence of crosswalks, number of lanes, grade, road structures such as bridges or tunnels, etc. Characteristics may not have to match exactly to be considered similar, especially in cases where characteristics are continuous rather than discrete. Some characteristics, i.e., key characteristics, may be given greater weight than others in determining whether two route features for similar. For example, the turning angle of a turn may be considered a key characteristic. Additionally or alternatively, the similarity model 109*b*1 may be trained by the ML module 109*c* to identify similar route features. The similarity model 109*b*1, for example, may utilize a distance mechanism to determine the distance between a route feature and other route features, and identify route features having a distance within a particular tolerance.

From either block 236 or 238, the flow can proceed to block 240, where the user computing device 102 determines whether the user input indicates any other conditions that should be included in the trigger condition. If so, then the user computing device 102 can include these other conditions in the trigger condition at block 242. Conditions may be explicitly specified in the user input, or implicitly/partially specified, such that the conditions are determined by analyzing the user input using the NLP model 109*a*3, similarity model 109*b*1, and/or ML module 109*c*. Other conditions may be any conditions that should be present in order for the reminder to be triggered, and can be any conditions that the user wishes to specify. As an example, a condition may be speed, such that the reminder will only be triggered if the user is traveling below/above a speed or within/outside of a speed range. As another example, a condition may be a time or time range, such that the reminder should only be provided if at/within the time/time range. From either block 242 or 240, the flow can proceed with block 210, depicted in FIG. 2A.

Turning back to FIG. 2A, at block 210, the user computing device 102 analyzes the user input to determine the content of the reminder (also referred to herein as the reminder content). The reminder content corresponds to the information, such as an instruction, that the user computing device 102 should provide when providing the reminder. For example, if the user input includes, "remind me to approach this pothole more slowly." The reminder content would be "this is a reminder to approach the upcoming pothole more slowly," or a similar variation conveying that the user should approach the pothole more slowly. The reminder content conveys the information that the user wishes to receive, as indicated by the user input. Accordingly, while the reminder content may include an instruction to perform an action, such as a navigation maneuver, or to perform the action in a certain manner (e.g., approach a turn more slowly), more generally, the reminder content can convey any information specified by the user (e.g., an informational note or comment). To determine the reminder content, the user computing device 102 can analyze the user input using the NLP model 109*a*3

Additionally or alternatively, the reminder content may include an action that the user computing device 102 should perform when the reminder is triggered. Example actions include sending a message via an application (e.g., a short message service (SMS) message or e-mail), initiating a telephone or video call, activating an application of the user computing device 102, etc. For example, the user input may include "call John when I'm ten minutes away from John's house." The user computing device 102, when at the trigger location (a distance predicted by the navigation application 108 to be ten minutes away from John's house), the user computing device 102 can initiate a telephone call to John.

At block 212, the user computing device 102 stores the reminder, including the trigger condition and the reminder content. The user computing device 102 can store the reminder on the memory 106, for example, and/or can transmit the reminder to the external server 120 or vehicle computing device 150 for storage.

At block 214, the user computing device 102 detects that a trigger condition is satisfied during a navigation session. If the user computing device 102 receives the user input at block 202 during an initial navigation session, then the user computing device 102 may detect the trigger condition during a subsequent navigation session, or later during the initial navigation session. More particularly, the navigation application 108, implemented on the user computing device 102, may detect the trigger condition. Accordingly, the reminder stored at block 212 is stored such that the reminder is accessible by the navigation application 108.

The manner in which the user computing device 102 detects the trigger condition depends on the form of the trigger condition. Generally speaking, detecting the trigger condition includes detecting that the user computing device 102 is approaching the trigger location. The user computing device 102 may qualify as "approaching" the trigger location if the user computing device 102 is within a predetermined distance of the trigger location, or within a predetermined time (based on the speed at which the user computing device 102 is approaching the trigger location) of the trigger location. The predetermined distance or time may be based on the reaction time of a human, such that the user has sufficient time to react to the reminder after receiving the reminder and before reaching the trigger location. As another example, the user computing device 102 may qualify as "approaching" the trigger location if the next navigation instruction to be provided to the user includes the trigger location.

In addition to trigger location, the user computing device 102 bases trigger condition detection on any other conditions included in the trigger condition. If the trigger condition includes a speed or speed range, the user computing device 102 can determine that the speed is at, above, or above, the speed or speed range (depending on the condition). For example, if the trigger condition includes triggering the reminder at a particular trigger location if the user is traveling at or above a speed, then the user computing device 102 does not detect the trigger condition unless the user computing device 102 detects both conditions (i.e., that the user is approaching the trigger location and is traveling at or above the speed).

At block 216, the user computing device 102 provides the reminder in response to detecting the trigger condition. As noted above, the user computing device 102 can take into account the speed at which the user computing device 102 is approaching the trigger location, in order to determine when to provide the reminder. For example, the user computing device 102 can determine, based on the speed, when the user computing device 102 will reach the trigger location, and can determine to provide the reminder at a time prior to the trigger location such that the user has sufficient time to react to the reminder prior to reaching the trigger location.

To provide the reminder, the user computing device 102 may emit an audio reminder that communicates the reminder content. To provide the audio reminder, the user computing device 102 can utilize the same synthesized voice as the voice utilized for the navigation instructions during the navigation session. Alternatively, the user computing device 102 can utilize a different synthesized voice than the voice utilized in the navigation instructions, to distinguish the reminder from the navigation instructions. Additionally or alternatively to the audio reminder, the user computing device 102 can display text or another graphical indication of the reminder on a GUI of the navigation application 108. The displayed text and/or emitted phrase included in the audio reminder conveys the reminder content. To generate the text to display or the audio reminder to emit, the user computing device 102 can utilize the language processing module 109a (e.g., the text-to-speech engine 109a2), which can determine how to phrase, as written or spoken, the reminder content.

Optionally, after providing the reminder, the user computing device 102 may monitor for feedback from the user regarding the reminder. In some implementations, the user computing device 102 monitors for user feedback a predetermined amount of time (e.g., a 1-10 seconds) after providing the reminder. For example, the user computing device 102 can activate a microphone or other listening device of the user computing device 102 for the predetermined amount of time, such that if the user provides audio feedback related to the reminder, the user computing device 102 can receive the audio input (without continuously listening to the interior of the vehicle). Accordingly, the user computing device 102 can refrain from actively listening to a vehicle interior during a navigation session and/or at any other time, except when the user computing device 102 provides a reminder to the user or when the user initiates providing input to the user computing device 102. As another example the user computing device 102 can display a prompt or other icon for the predetermined amount of time, which the user can interact with in order to initiate and provide feedback. Additionally or alternatively, the user computing device 102 can receive user feedback for the reminder after the navigation session. The user computing device 102 can prompt the user for feedback regarding the reminder (e.g., via a speaker, or via a push notification or other GUI element of the navigation application 108), or the user can interact with the navigation application 108 to provide the reminder (e.g., by interacting with a menu of the navigation application 108).

The feedback may edit the trigger condition or the content. For example, the user may request that the user computing device 102 provide the reminder earlier, or at a new or additional trigger location. As another example, the user may request that the user computing device 102 only trigger the reminder if the user is traveling at or above a specific speed. As yet another example, the user can update the content by specifying information that the reminder should convey, such as "remind me that the pothole is on the right side of the road," or "remind me that I should approach the pothole at less than 30 miles per hour" (in cases where the reminder relates to an upcoming pothole). In some cases, the feedback may indicate that the reminder should be deleted (e.g., "Please don't remind me about this pothole anymore"). In still other cases, the feedback may indicate that the reminder should be expanded to other trigger locations (e.g., "Please also remind me to go more slowly when approaching turns like that turn").

In cases where the reminder was created to include similar route features, the user computing device 102 can refine the reminder based on the feedback. For example, the user computing device 102 may create a reminder for turns having a similar turning angle to a first turn. However, after providing a reminder for a similar, second turn, the user feedback may indicate, "don't remind me about that turn anymore." The user computing device 102 can delete the second turn from the trigger locations for the reminder. Further, the user computing device 102 can determine whether there is a characteristic missing from the second turn that was present in the first turn, such as a visual blockage. The user computing device 102 can then edit the reminder to, instead of including turns having a similar turning angle to the first turn, include turns having similar visual blockages of the first turn. As another example, the user computing device 102 may create a reminder for route features having five similar characteristics to a first route feature. Based on user feedback (which could be feedback on multiple reminders), the user computing device 102 can determine which characteristics the user finds important, and refine the characteristics accordingly (e.g., by refining the list of five similar characteristics to a list of three similar characteristics). More generally, the user computing device 102 can utilize the feedback to refine which route features are considered similar, and edit the reminder accordingly. The feedback, for example, may be provided to the similarity model 109b1 and/or the ML module 109c, so that the similarity model 109b1 and/or the ML module 109c can take the feedback into account when generating the reminder and future reminders.

Further, as mentioned above, the user computing device 102 can also request feedback from the user (e.g., via a speaker of the user computing device 102, or via a push notification or other GUI element of the navigation application 108), if clarification is needed (e.g., because a trigger condition and/or reminder content is not fully specified by the user, or to filter results provided by the similarity model 109b1). The user computing device 102 can request feedback upon creating the reminder (i.e., during blocks 208, 210), directly after creating the reminder, after the navigation session where the reminder was created, before/during a navigation session when the reminder is to be provided, after a navigation session where the reminder was provided, etc.

Figure 2C:
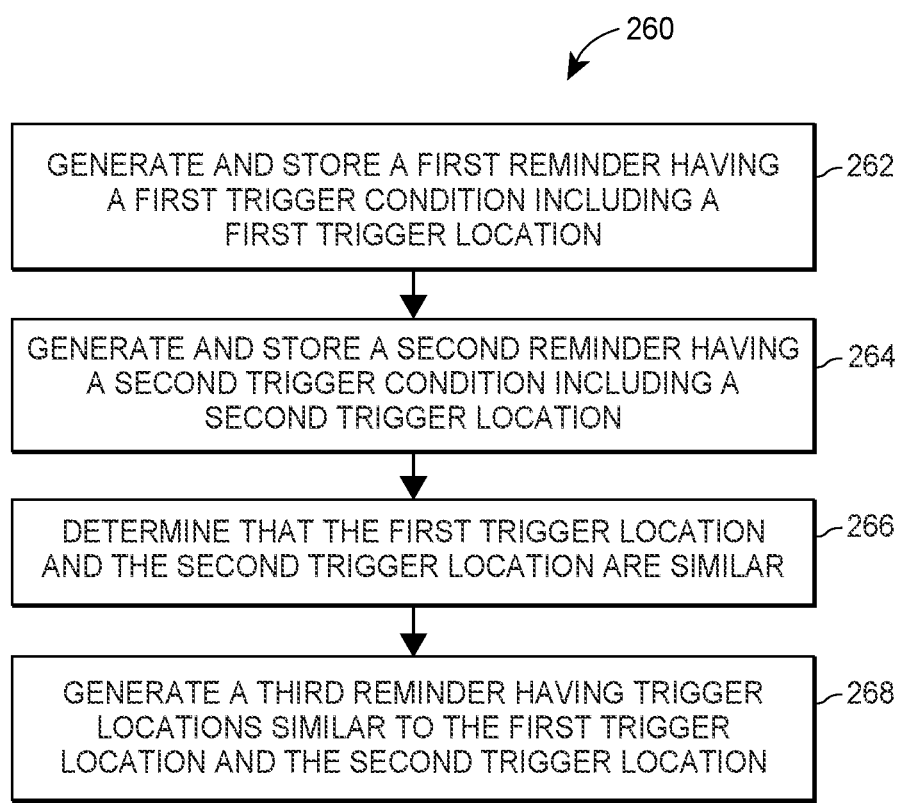
FIG. 2C is a flow diagram of an example method for generating a reminder based on two similar reminders.

Referring to FIG. 2C, a method 200C for generating a general reminder based on stored reminders is illustrated. At block 262, the user computing device 102 generates and stores a first reminder having a first trigger condition including a first trigger location (e.g., using the method 200). At block 264, the user computing device 102 generates and stores a second reminder having a second trigger condition including a second trigger location (e.g., using the method 200). At block 266, the user computing device 102 determines that the first trigger location and the second trigger location are similar. To determine that two trigger locations are similar, the user computing device 102 may determine that the two trigger locations share at least a certain minimum number of characteristics (e.g., one characteristic, two characteristics, etc.). Alternatively, the user computing device 102 may determine that the two locations are similar (e.g., within a threshold of a distance metric), as determined by a trained machine learning model (e.g., the similarity model 109b1 trained by the ML module 109c).

At block 266, in response to the determination at block 266, the user computing device 102 generates a third reminder having trigger locations similar to the first and second trigger locations. Accordingly, the trigger condition for the third reminder may include multiple trigger locations. To determine the similar trigger locations (or similar route features, each route feature having a location), the user computing device 102 may utilize the similarity model 109b1 to analyze the locations included in the map database 156 and/or the POI database 159. Depending on the implementation, the similarity model 109b1 may only analyze a portion of the locations included in the map database 156/POI database 159 (e.g., a portion including the geographic region of the user, and/or a portion including routes previously traveled by the user). Similar trigger locations may be those that share the same characteristics as the first and second trigger locations, or those that are similar as determined by a trained machine learning model, as mentioned above. The trigger locations included in the third reminder may include the first trigger location and the second trigger location, and the user computing device 102 can delete the first reminder and the second reminder, or the trigger locations may exclude the first trigger location and the second trigger location, and the user computing device 102 can retain the first reminder and the second reminder (e.g., if the content of the first and second reminders is different). Because the third reminder is based on other reminders, the third reminder may be referred to as a general reminder.

While the method 200C includes generating a general reminder based on identifying two similar reminders, it should be understood that, in some implementations, a general reminder may only be generated if a predetermined number of reminders share one or more similar characteristics (e.g., where the predetermined number can be two or more). For example, a general reminder may be generated if at least five reminders have been created that share one or more characteristics. Further, the predetermined number of reminders required to trigger creating a general reminder may vary depending on the number of similar characteristics, where, if the reminders share more similarities, a few number of reminders is required to trigger generation of a general reminder. For example, if two reminders share a first number of characteristics (e.g., five characteristics), this may cause the user computing device 102 to generate a third reminder for locations having these characteristics. If three reminders share a second number of characteristics, where this second number may be less than the first number of characteristics, this may cause the user computing device to generate a fourth reminder for locations having these characteristics. Further, depending on the implementation, the analysis may not require a set number of characteristics and/or reminders. For example, the similarity model 109b1 may be trained (e.g., by the ML module 109c) to identify that a set of reminders (or more particularly, the trigger locations for those reminders) are similar, as defined by a distance metric determined during training. The user computing device 102 can then define a general reminder based on the set of reminders.

Example Reminder Generation and Provision

Figure 3A:
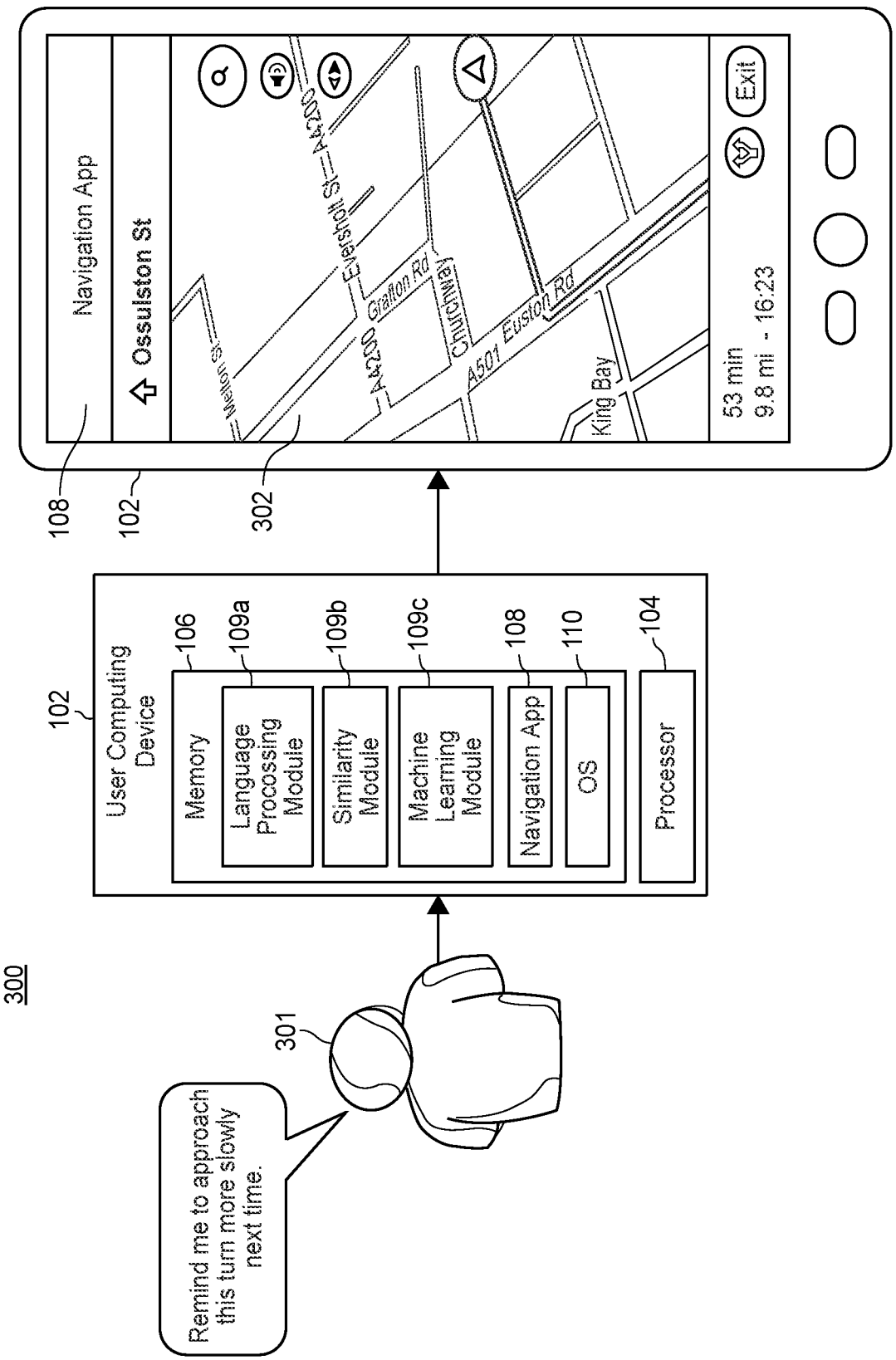
FIG. 3A illustrates an example scenario in which a user requests a reminder.
Figure 3B:
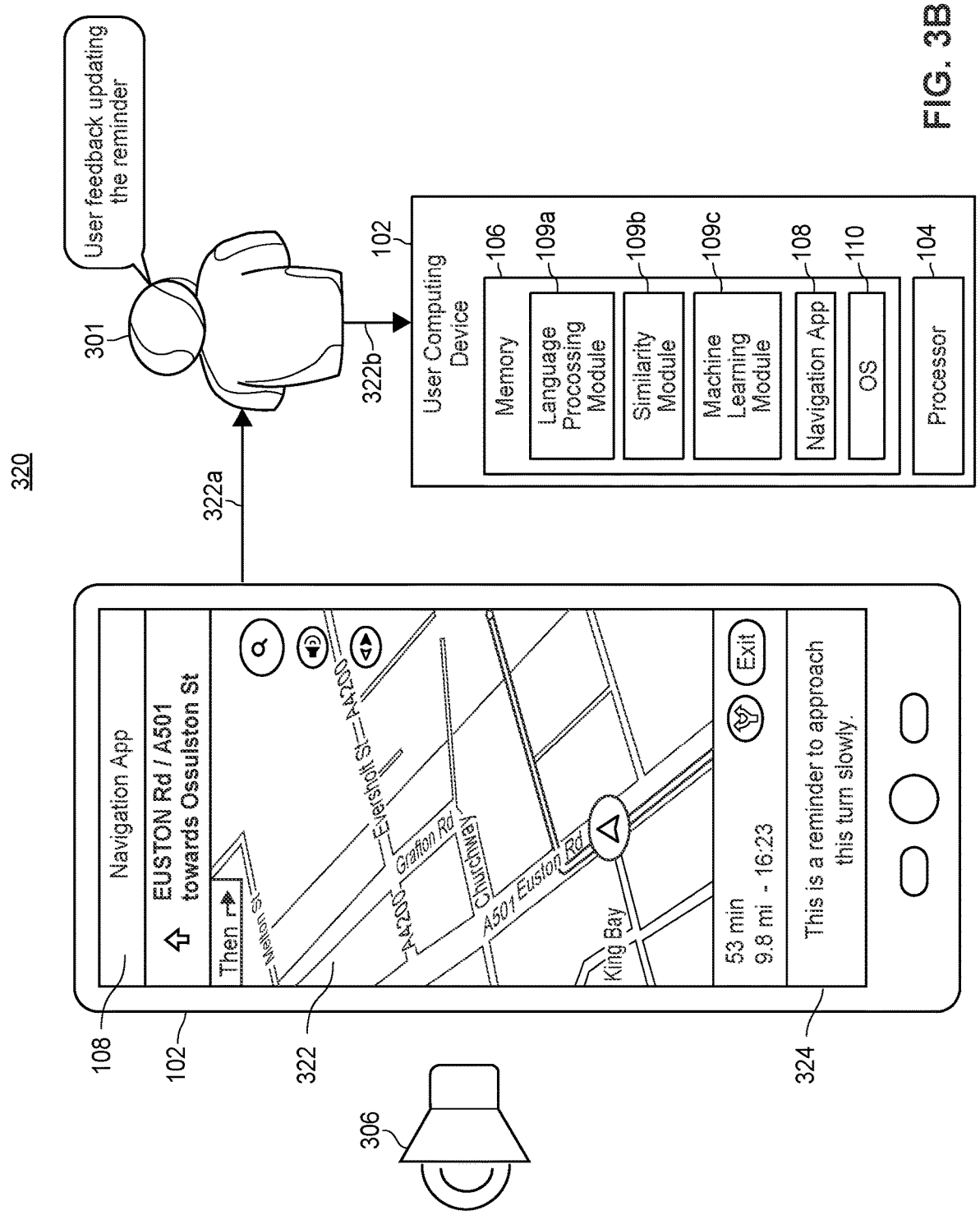
FIG. 3B illustrates an example scenario in which a navigation application provides the reminder generated in FIG. 3A, and the user can provide feedback for the reminder.

Turning to FIGS. 3A-3B, these figures illustrate example scenarios in which a user requests a reminder, and the user computing device 102 later provides the reminder. In the scenario 300 illustrated by FIG. 3A, a user 301 provides an input to the user computing device 102 (e.g., as described at block 202). When the user computing device 102 receives the input, the user computing device 102 is providing a navigation session, and rendering navigation instructions on a display screen 302, in a GUI of the navigation application 108, for viewing by the user 301. The user computing device 102 may also be providing the navigation instructions by emitting audio instructions. Shortly after navigating a turn (e.g., a right turn from Euston Rd onto Ossulston St), as illustrated on the display screen 302), the user 301 provides the input "Remind me to approach this turn more slowly next time." The user computing device 102 can then use the method 200 to generate a reminder based on the input received from the user 301. As described with reference to FIGS. 2A and 2B, the user computing device 102 can determine the trigger location corresponding to "this turn" based on the location of the user computing device 102 at the time when the user computing device 102 received the input. In the example scenario 300, the user computing device 102 is located just after the right turn from Euston Rd (as shown on the display screen 302). Accordingly, the user computing device 102 can determine that "this turn" refers to the right turn from Euston Rd. The user computing device 102 can then store a reminder including the reminder content (e.g., "Approach this turn slowly") and the trigger condition (the trigger location corresponding to the location of the right turn from Euston Rd onto Ossulston St). In other examples, the user computing device 102 may receive the input just before or while navigating the turn. Based on the proximity of the user computing device 102 to the right turn from Euston Rd, the user computing device 102 can determine that "this turn" refers to the right turn from Euston Rd.

FIG. 3B illustrates a scenario 320, which occurs during a subsequent navigation session after the navigation session illustrated in FIG. 3A. During the subsequent navigation session, the user computing device 102 is providing navigation instructions to the user 301, which are rendered on the display screen 322 in a GUI of the navigation application 108. The user computing device 102 detects that the user computing device 102 is approaching the trigger location (i.e., approaching the right turn from Euston Rd onto Ossulston St, as indicated by the navigation instructions rendered on the display screen 322). In response, the user computing device 102 provides the reminder to the user 301, where transmission of the reminder to the user 301 is indicated by arrow 322a. In the example scenario 320, the user computing device 102 can emit audio, via a speaker 306 (e.g., of the I/O Module 118 or of the vehicle computing device 150, if the user computing device 102 is communicatively coupled to the vehicle computing device 150). Alternatively or in addition, the user computing device 102 can also display a prompt 324 conveying the reminder content. Further, the user computing device 102 may display a pin or other icon indicating the trigger location on the map rendered on the display screen 322.

Optionally, after receiving the reminder, the user 301 can provide user feedback regarding the reminder. The user computing device 102 can receive the reminder, as indicated by the arrow 322b. The user computing device 102 can analyze the feedback, using the techniques discussed above with FIGS. 2A and 2B (and, in particular, blocks 208 and 210), update the reminder accordingly, and store the updated reminder.

While not illustrated in FIGS. 3A and 3B, depending on the implementation, the navigation application 108 may optionally enable the user 301 to manage and create new reminders, within or outside of navigation sessions. Menu options provided by the navigation application 108 (accessible by interacting with GUIs or via voice input) may allow the user 301 to view existing reminders (e.g., in a list or map view, displayed by the user computing device 102), manually edit such reminders or request that the user computing device 102 edit the reminders, and request new reminders.

Figure 4:
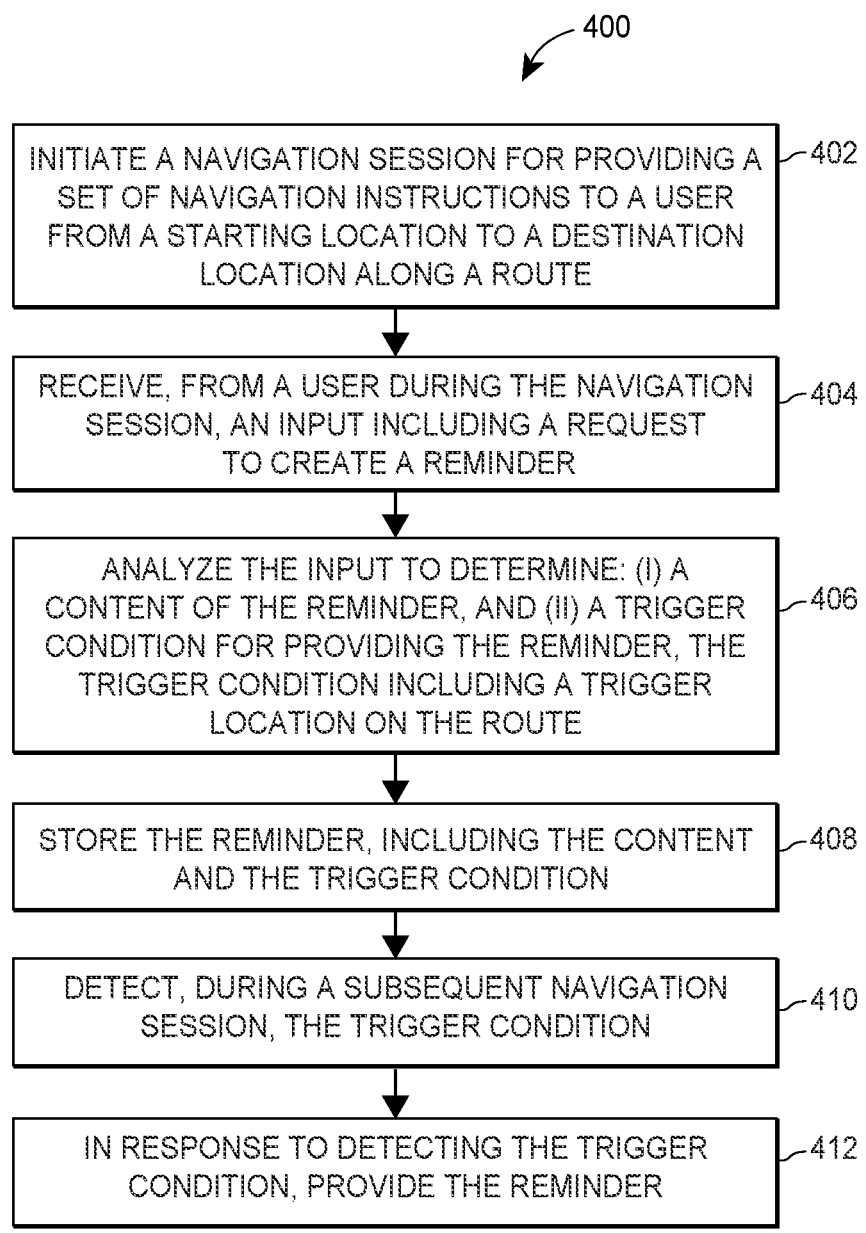
FIG. 4 is a flow diagram of another example method for creating reminders and providing reminders during navigation sessions, which can be implemented in a computing device, such as the user computing device of FIG. 1.

Turning to FIG. 4, a method 400 for creating and providing reminders during navigation sessions is illustrated, which can be implemented in a computing device, such as the user computing device 102. The method 400 can be implemented as a set of instructions stored on a computer-readable memory and executable at one or more processors the computing device (e.g., the processor(s) 104). It is to be understood that, for ease of discussion only, the "user computing device" discussed in reference to FIG. 4 may correspond to the user computing device. However, similar to the methods 200A-C, it is to be understood that, throughout the description of FIG. 4, actions described as being performed by the user computing device 102 may, in some implementations, be performed by the external server 120, the vehicle computing device 150, and/or the user computing device 102, the external server 120, and/or the vehicle computing device in parallel. As an example, a user may interact with the external server 120 through the user computing device 102, such that the navigation instructions and reminders are received at the user computing device 102 from the external server 120 and passed to the user via the user computing device 102. The user computing device 102, the external server 120, and/or the vehicle computing device 150 may utilize the language processing module 109a. 120a, 153a, the machine learning module 109c. 120c, 153c, and/or the similarity module 109b, 120d, 153d, to create and provide reminders.

At block 402, the method 400 includes initiating a navigation session for providing a set of navigation instructions to a user from a starting location to a destination location along a route. The navigation session may be provided by a navigation application (e.g., the navigation application 108). At block 404, the method 400 includes receiving, from a user (e.g., the user 301) during the navigation session, an input (e.g., a speech input, an input received from a user interface) including a request to create a reminder (e.g., block 202). It should be understood that while example method 400 includes receiving an input during a navigation session, in other embodiments, input may be received outside (e.g., before or after) a navigation session. In addition, the input may be received in a variety of forms, depending on the embodiment, such as a speech input, a textual input, and/or interactions with UI elements. When the user initiates the input (i.e., when the user computing device receives the user input), the user computing device can record data regarding current route status (e.g., location, direction of travel, speed) (e.g., block 204).

At block 406, the method 400 includes analyzing the input to determine: (i) a content of the reminder, and (ii) a trigger condition for providing the reminder, the trigger condition including a trigger location on the route (e.g., blocks 208, 210, method 250). If the input is received in the form of a speech input, to analyze the speech input, the speech input may be transcribed into a set of text, and the set of text may be analyzed. Analyzing the input to determine content may include determining an instruction to provide when providing the reminder.

Analyzing the input to determine the trigger condition may include determining whether the input indicates the trigger location. In response to determining that the input specifies an explicit location, the computing device can identify the explicit location as the trigger location (e.g., block 222). In other cases, analyzing the input may include determining that the input specifies a feature (e.g., a road segment or navigation instruction) of the route (e.g., block 226). In response, computing device can identify a location of the feature as the trigger location. In still other cases, in response to determining that the input does not indicate the trigger location, the location of the user recorded when the user initiated the input can be identified as the trigger location.

In some implementations, analyzing the input to determine the trigger condition further includes determining that the input indicates to provide the reminder for features similar to a first feature, identifying one or more features similar to the first feature, and identifying the trigger location as including one or more locations corresponding to the respective one or more features (e.g., block 236, 238). The one or more similar features may be identified in response to identifying that each of the one or more features share a predetermined number of characteristics with the first feature, and/or analyzing the first feature using a machine learning model to identify the one or more features.

At block 408, the method 400 includes storing the reminder, including the content and the trigger condition (e.g., block 212).

At block 410, the method 400 includes detecting, during a subsequent navigation session, the trigger condition (e.g., block 214). Detecting the trigger condition may include detecting that the user (or, more specifically, the user computing device) is approaching the trigger location included in the trigger condition. Method 400 may also include determining a direction of travel of the user when the user initiated the input, and detecting the trigger condition may include detecting that the user is approaching the trigger location in the direction of travel. Similarly, method 400 may include determining a speed of the user when the user initiated the input. In such cases, the speed may be included in the trigger condition, and detecting the trigger condition may include detecting that the user is approaching the trigger location at an approach speed within a predetermined range of the speed and/or at or above the speed. In some cases, analyzing the input to determine the trigger condition may include analyzing the input to determine a trigger speed (e.g., if the user input explicitly specifies that a trigger speed should be included in the trigger condition, or if user input implicitly specifies a trigger speed). Detecting the trigger location may include detecting that the user is approaching the trigger location at an approach speed within a predetermined range of the trigger speed and/or at or above the trigger speed. In addition, in some cases, analyzing the input to determine the trigger condition includes analyzing the input to determine a time or time range when the user wishes to receive the reminder, and detecting the trigger condition may include detecting that the user is approaching the trigger location at the time and/or within the time range.

At block 412, the method 400 includes, in response to detecting the trigger condition, providing the reminder (e.g., block 216). Providing the reminder may include providing the reminder at a time determined based on a speed that the user is approaching the trigger location. Further, providing the reminder may include providing the reminder using a synthesized voice different from a synthesized voice used to provide navigation instructions during the subsequent navigation session. Depending on the implementation, providing the reminder may include providing the reminder via at least one of a display or a speaker of the computing device (e.g., a display or a speaker of the user computing device, which may be a mobile device of the user), or transmitting the reminder to a user computing device to cause the user computing device to provide the reminder to the user (e.g., if the computing device is a server, such as the external server 120).

In some implementations, the method 400 includes generating a first reminder having a first trigger condition including a first trigger location at blocks 402-412, and further includes storing a second reminder having a second trigger condition including a second trigger location, identifying, based on analyzing the first reminder and the second reminder, at least one characteristic shared by the first trigger location and the second trigger location, and creating a third reminder having a trigger locations having the at least one characteristic (e.g., method 260).

Further, the method 400 may include monitoring for user feedback after providing the reminder (e.g., for a predetermined time window), and/or requesting user feedback for the reminder (e.g., after completing the subsequent navigation session, or after creating the reminder). The computing device can then modify the reminder based on the user feedback.

Aspects of the Present Disclosure

Aspect 1. A method in a computing device for creating and providing reminders during navigation sessions, the method comprising: initiating, by one or more processors of the computing device, a navigation session for providing a set of navigation instructions to a user from a starting location to a destination location along a route; receiving, by the one or more processors from a user during the navigation session, an input including a request to create a reminder; analyzing, by the one or more processors, the input to determine: (i) a content of the reminder, and (ii) a trigger condition for providing the reminder, the trigger condition including a trigger location on the route; storing, by the one or more processors, the reminder, including the content and the trigger condition; detecting, by the one or more processors, during a subsequent navigation session, the trigger condition; and in response to detecting the trigger condition, providing, by the one or more processors, the reminder.

Aspect 2. The method of aspect 1, wherein detecting the trigger condition includes: detecting that the user is approaching the trigger location.

Aspect 3. The method of aspect 2, further comprising: determining, by the one or more processors, a direction of travel of the user when the user initiated the input; and including, by the one or more processors, the direction of travel in the trigger condition; wherein detecting the trigger condition further includes: detecting that the user is approaching the trigger location in the direction of travel.

Aspect 4. The method of aspect 2 or 3, further comprising: determining, by the one or more processors, a speed of the user when the user initiated the input; and including, by the one or more processors, the speed in the trigger condition; wherein detecting the trigger condition further includes: detecting that the user is approaching the trigger location at an approach speed at least one of (a) within a predetermined range of the speed, or (b) at or above the speed.

Aspect 5. The method of aspect 2 or 3, wherein analyzing the input to determine the trigger condition includes analyzing the input to determine a trigger speed; and detecting the trigger condition further includes detecting that the user is approaching the trigger location at an approach speed at least one of (a) within a predetermined range of the trigger speed, or (b) at or above the trigger speed.

Aspect 6. The method of any one of aspects 2-5, wherein: analyzing the input to determine the trigger condition includes analyzing the input to determine a time or time range when the user wishes to receive the reminder; and detecting the trigger condition further includes detecting that the user is approaching the trigger location at least one of at the time or within the time range.

Aspect 7. The method of any one of aspects 2-6, wherein providing the reminder includes: providing the reminder at a time determined based on a speed that the user is approaching the trigger location.

Aspect 8. The method of any one of the preceding aspects, wherein analyzing the input to determine the trigger condition includes: determining whether the input indicates the trigger location.

Aspect 9. The method of aspect 8, wherein analyzing the input to determine the trigger condition includes: in response to determining that the input specifies an explicit location, identifying the explicit location as the trigger location.

Aspect 10. The method of aspect 8, wherein analyzing the input to determine the trigger condition includes: in response to determining that the input specifies a feature of the route, identifying a location of the feature as the trigger location.

Aspect 11. The method of aspect 10, wherein the feature includes at least one of: a road segment of the route; or a navigation instruction of the route.

Aspect 12. The method of aspect 9 or 10, wherein the feature is a first feature, and wherein analyzing the input to determine the trigger condition includes: determining that the input indicates to provide the reminder for features similar to the first feature; identifying one or more features similar to the first feature; and identifying the trigger location as including one or more locations corresponding to the respective one or more features.

Aspect 13. The method of aspect 12, wherein identifying the one or more features includes: identifying the one or more features in response to identifying that each of the one or more features share a predetermined number of characteristics with the first feature.

Aspect 14. The method of aspect 12 or 13, wherein identifying the one or more features includes: analyzing the first feature using a machine learning model to identify the one or more features.

Aspect 15. The method of aspect 8, further comprising: recording, by the one or more processors, a location of the user when the user initiated the input; wherein analyzing the input to determine the trigger location includes: in response to determining that the input does not indicate the trigger location, identifying the location as the trigger location.

Aspect 16. The method of any one of the preceding aspects, wherein the reminder is a first reminder having a first trigger condition including a first trigger location, and wherein the method further comprises: storing, by the one or more processors, a second reminder having a second trigger condition including a second trigger location; identifying, by the one or more processors based on analyzing the first reminder and the second reminder, at least one characteristic shared by the first trigger location and the second trigger location; and creating, by the one or more processors, a third reminder having a plurality of trigger locations having the at least one characteristic.

Aspect 17. The method of any one of the preceding aspects, further comprising: monitoring, by the one or more processors, for user feedback for a predetermined time window after providing the reminder.

Aspect 18. The method of any one of aspects 1-16, further comprising: requesting, by the one or more processors, user feedback for the reminder after completing the subsequent navigation session.

Aspect 19. The method of aspect 17 or 18, further comprising: modifying, by the one or more processors, the reminder based on the user feedback.

Aspect 20. The method of any one of the preceding aspects, wherein providing the reminder includes: providing the reminder using a first synthesized voice different from a second synthesized voice used to provide navigation instructions during the subsequent navigation session.

Aspect 21. The method of any one of the preceding aspects, wherein the input is a speech input, the method further comprising: transcribing, by the one or more processors, the speech input into a set of text; wherein analyzing the speech input includes analyzing the set of text.

Aspect 22. The method of any one of the preceding aspects, wherein analyzing the input to determine the content includes: determining an instruction to provide when providing the reminder.

Aspect 23. The method of any one of the preceding aspects, wherein providing the reminder includes: providing the reminder via at least one of a display or a speaker of the computing device.

Aspect 24. The method of any one of the preceding aspects, wherein the computing device is a mobile device of the user.

Aspect 25. The method of any one of aspects 1-22, wherein the computing device is a server, and wherein providing the reminder includes: transmitting the reminder to a mobile device of the user to cause the mobile device to provide the reminder to the user.

Aspect 26. A computing device for creating and providing reminders during navigation sessions, the computing device comprising: one or more processors; and a non-transitory computer-readable memory coupled to the one or more processors and storing instructions thereon that, when executed by the one or more processors, cause the computing device to: initiate a navigation session for providing a set of navigation instructions to a user from a starting location to a destination location along a route; receive, from a user during the navigation session, an input including a request to create a reminder; analyze the input to determine: (i) a content of the reminder, and (ii) a trigger condition for providing the reminder, the trigger condition including a trigger location on the route; store the reminder including the content and the trigger condition; detect, during a subsequent navigation session, the trigger condition; and in response to detecting the trigger condition, provide the reminder.

Aspect 27. A tangible, non-transitory computer-readable medium storing instructions for creating and providing reminders during navigation sessions, that when executed by one or more processors, cause the one or more processors to: initiate a navigation session for providing a set of navigation instructions to a user from a starting location to a destination location along a route; receive, from a user during the navigation session, an input including a request to create a reminder; analyze the input to determine: (i) a content of the reminder, and (ii) a trigger condition for providing the reminder, the trigger condition including a trigger location on the route; store the reminder including the content and the trigger condition; detect, during a subsequent navigation session, the trigger condition; and in response to detecting the trigger condition, provide the reminder.

Additional Considerations

The following additional considerations apply to the foregoing discussion. Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter of the present disclosure.

Additionally, certain embodiments are described herein as including logic or a number of components, modules, or mechanisms. Modules may constitute either software modules (e.g., code stored on a machine-readable medium) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term hardware should be understood to encompass a tangible entity, be that an entity that is physically constructed, permanently configured (e.g., hardwired), or temporarily configured (e.g., programmed) to operate in a certain manner or to perform certain operations described herein. As used herein "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The methods 200, 250, 260, and/or 400 may include one or more function blocks, modules, individual functions or routines in the form of tangible computer-executable instructions that are stored in a computer-readable storage medium, optionally a non-transitory computer-readable storage medium, and executed using a processor of a computing device (e.g., a server device, a personal computer, a smart phone, a tablet computer, a smart watch, a mobile computing device, or other client computing device, as described herein). The methods 200, 250, 260, and/or 400 may be included as part of any backend server (e.g., a map data server, a navigation server, or any other type of server computing device, as described herein), client computing device modules of the example environment, for example, or as part of a module that is external to such an environment. Though the figures may be described with reference to the other figures for ease of explanation, the methods 200, 250, 260, and/or 400 can be utilized with other objects and user interfaces. Furthermore, although the explanation above describes steps of the methods 200, 250, 260, and/or 400 being performed by specific devices (such as a user computing device), this is done for illustration purposes only. The blocks of the methods 200, 250, 260, and/or 400 may be performed by one or more devices or other parts of the environment.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as an SaaS. For example, as indicated above, at least some of the operations may be performed by a group of computers (as examples of machines including processors), these operations being accessible via a network (e.g., the Internet) and via one or more appropriate interfaces (e.g., APIs).

Still further, the figures depict some embodiments of the example environment for purposes of illustration only. One skilled in the art will readily recognize from the following discussion that alternative embodiments of the structures and methods illustrated herein may be employed without departing from the principles described herein.

Upon reading this disclosure, those of skill in the art will appreciate still additional alternative structural and functional designs for creating reminders and providing reminders during navigation sessions through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method in a computing device for creating and providing reminders during navigation sessions, the method comprising:

initiating, by one or more processors of the computing device, a navigation session for providing a set of navigation instructions to a user from a starting location to a destination location along a route;

receiving, by the one or more processors from a user during the navigation session, an input including a request to create a reminder;

analyzing, by the one or more processors, the input to determine: (i) a content of the reminder, and (ii) a trigger condition for providing the reminder, the trigger condition including a trigger location on the route and a time or time range for receiving the reminder;

storing, by the one or more processors, the reminder, including the content and the trigger condition;

detecting, by the one or more processors, during a subsequent navigation session, the trigger condition including detecting that the user is approaching the trigger location within the time or the time range; and in response to detecting the trigger condition, providing, by the one or more processors, the reminder.

2. The method of claim 1, wherein detecting the trigger condition includes:
  detecting that the user is approaching the trigger location.

3. The method of claim 2, further comprising:
  determining, by the one or more processors, a direction of travel of the user when the user initiated the input; and
  including, by the one or more processors, the direction of travel in the trigger condition;
  wherein detecting the trigger condition further includes:
  detecting that the user is approaching the trigger location in the direction of travel.

4. The method of claim 2, further comprising:
  determining, by the one or more processors, a speed of the user when the user initiated the input; and
  including, by the one or more processors, the speed in the trigger condition;
  wherein detecting the trigger condition further includes:
  detecting that the user is approaching the trigger location at an approach speed at least one of (a) within a predetermined range of the speed, or (b) at or above the speed.

5. The method of claim 2, wherein providing the reminder includes:
  providing the reminder at a time determined based on a speed that the user is approaching the trigger location.

6. The method of claim 1, wherein analyzing the input to determine the trigger condition includes:
  determining whether the input indicates the trigger location.

7. The method of claim 6, wherein analyzing the input to determine the trigger condition includes:
  in response to determining that the input specifies an explicit location, identifying the explicit location as the trigger location.

8. The method of claim 6, wherein analyzing the input to determine the trigger condition includes:
  in response to determining that the input specifies a feature of the route, identifying a location of the feature as the trigger location.

9. The method of claim 8, wherein the feature includes at least one of:
  a road segment of the route; or
  a navigation instruction of the route.

10. The method of claim 8, wherein the feature is a first feature, and wherein analyzing the input to determine the trigger condition includes:
  determining that the input indicates to provide the reminder for features similar to the first feature;
  identifying one or more features similar to the first feature; and
  identifying the trigger location as including one or more locations corresponding to the respective one or more features.

11. The method of claim 10, wherein identifying the one or more features includes:
  identifying the one or more features in response to identifying that each of the one or more features share a predetermined number of characteristics with the first feature.

12. The method of claim 10, wherein identifying the one or more features includes:
  analyzing the first feature using a machine learning model to identify the one or more features.

13. The method of claim 6, further comprising:
  recording, by the one or more processors, a location of the user when the user initiated the input;
  wherein analyzing the input to determine the trigger location includes:
  in response to determining that the input does not indicate the trigger location, identifying the location as the trigger location.

14. The method of claim 1, wherein the reminder is a first reminder having a first trigger condition including a first trigger location, and wherein the method further comprises:
  storing, by the one or more processors, a second reminder having a second trigger condition including a second trigger location;
  identifying, by the one or more processors based on analyzing the first reminder and the second reminder, at least one characteristic shared by the first trigger location and the second trigger location; and
  creating, by the one or more processors, a third reminder having a plurality of trigger locations having the at least one characteristic.

15. The method of claim 1, further comprising:
  monitoring, by the one or more processors, for user feedback for a predetermined time window after providing the reminder; and
  modifying, by the one or more processors, the reminder based on the user feedback.

16. The method of claim 1, further comprising:
  requesting, by the one or more processors, user feedback for the reminder after completing the subsequent navigation session; and
  modifying, by the one or more processors, the reminder based on the user feedback.

17. The method of claim 1, wherein the computing device is at least one of:
  a mobile device of the user; or
  a server, wherein providing the reminder includes transmitting the reminder to a mobile device of the user to cause the mobile device to provide the reminder to the user.

18. A computing device for creating and providing reminders during navigation sessions, the computing device comprising:
  one or more processors; and
  a computer-readable memory coupled to the one or more processors and storing instructions thereon that, when executed by the one or more processors, cause the computing device to:
  initiate a navigation session for providing a set of navigation instructions to a user from a starting location to a destination location along a route;
  receive, from a user during the navigation session, an input including a request to create a reminder;
  analyze the input to determine: (i) a content of the reminder, and (ii) a trigger condition for providing the reminder, the trigger condition including a trigger location on the route and a time or time range for receiving the reminder;
  store the reminder including the content and the trigger condition;
  detect, during a subsequent navigation session, the trigger condition including detecting that the user is approaching the trigger location within the time or the time range; and
  in response to detecting the trigger condition, provide the reminder.

19. A non-transitory computer-readable medium storing instructions for creating and providing reminders during navigation sessions, that when executed by one or more processors, cause the one or more processors to:

initiate a navigation session for providing a set of navigation instructions to a user from a starting location to a destination location along a route;
receive, from a user during the navigation session, an input including a request to create a reminder;
analyze the input to determine: (i) a content of the reminder, and (ii) a trigger condition for providing the reminder, the trigger condition including a trigger location on the route and a time or time range for receiving the reminder;
store the reminder including the content and the trigger condition;
detect, during a subsequent navigation session, the trigger condition including detecting that the user is approaching the trigger location within the time or the time range; and
in response to detecting the trigger condition, provide the reminder.

* * * * *